United States Patent [19]
Schiff

[11] 3,965,084
[45] June 22, 1976

[54] ASHLESS DISPERSANT PRODUCTS AND PROCESS

[75] Inventor: Sidney Schiff, Bartlesville, Okla.

[73] Assignee: Phillips Petroleum Company, Bartlesville, Okla.

[22] Filed: May 12, 1975

[21] Appl. No.: 576,940

Related U.S. Application Data

[62] Division of Ser. No. 503,800, Sept. 6, 1974, Pat. No. 3,909,421.

[52] U.S. Cl............................................. 260/96.5 R
[51] Int. Cl.$^2$........................................ C07C 127/00
[58] Field of Search............................... 260/96.5 R

[56] References Cited
UNITED STATES PATENTS

| | | |
|---|---|---|
| 2,721,843 | 10/1955 | Palmer, Jr.............................. 252/33 |
| 3,401,117 | 9/1968 | Schiff.................................... 252/33 |
| 3,438,898 | 4/1969 | Schlobolm et al..................... 252/33 |
| 3,703,536 | 11/1972 | Piasek et al...................... 260/462 R |
| 3,718,663 | 2/1973 | Piasek et al...................... 260/326.3 |

Primary Examiner—Daniel E. Wyman
Assistant Examiner—Y. Harris Smith

[57] ABSTRACT

Improved additives for lubricants and motor fuels are provided by reacting a petroleum sulfonic acid with an adduct formed from an amine and either urea or thiourea. Lubricating oil compositions and motor fuels containing said additives are also provided.

10 Claims, No Drawings

ASHLESS DISPERSANT PRODUCTS AND PROCESS

This is a divisional application of application Ser. No. 503,800, filed Sept. 6, 1974, entitled "Additives for Lubricants and Motor Fuels," now U.S. Pat. No. 3,909,427.

This invention relates to improved additives for lubricants and motor fuels. In one aspect, this invention relates to the preparation of novel compositions of matter formed from petroleum sulfonic acids and an adduct formed from an amine and either urea or thiourea. In accordance with another aspect, this invention relates to lubricant compositions containing as an additive the reaction product formed from a petroleum sulfonic acid and an adduct from an amine and either urea or thiourea. In another aspect, this invention relates to motor fuel compositions containing as an additive the reaction product formed by contacting a petroleum sulfonic acid with an adduct of an amine and either urea or thiourea.

At the present time it is common practice to enhance or modify certain of the properties of lubricating oils through the use of various additives or improvement agents. The lubricating oils employed in internal combustion engines, such as automotive, light aircraft, and diesel engines, in particular, require the use of additive agents to render them serviceable under the adverse environmental conditions frequently encountered in the operation of these engines. Among the various additives employed in modern engine oils, one of the most important is the type which acts to prevent accumulation of sludge on the crankcase and on the cylinder walls, thereby preventing sticking of the piston rings, and the formation of varnish-like coating on the pistons and cylinder walls. Because of their general function of maintaining a clean engine, additives of this nature are termed "detergents" although it is now understood that they have little utility in cleaning a dirty engine but by virtue of dispersant activity prevent or greatly retard engine fouling.

As cleanliness requirements have called for greater concentrations of detergent additives, the problem of ash deposition in the combustion chamber has become more serious. Especially is this a problem in certain engines which tend to develop violent preignition troubles in the presence of metal-containing ash. These problems have increased the importance and desirability of using "ashless" detergents.

An ashless detergent is one which shows substantially no ash when tested by ASTM procedure D-482-59T. The only possible source of metal when using such an additive is that of corrosion products and trace quantities present in some crude oils. It can be generally stated that metal-containing deposits in an engine (1) contribute to valve burning, (2) contribute to preignition, (3) tend to foul and short-out spark plugs, and (4) tend to increase octane requirements. Use of conventional metal-containing detergents can contribute to the deposit of metal-containing materials in the combustion chamber. Metal-containing deposits do not form from ashless detergents. Use of an ashless detergent, therefore, materially reduces the problems normally encountered in internal combustion engines in connection with metal-containing deposits.

It has been found that reaction products having improved detergent and dispersant properties can be prepared by reacting a petroleum sulfonic acid with an adduct formed from at least one amine and either urea or thiourea. Thus, broadly speaking, the present invention resides in the reaction product or products obtained when a petroleum sulfonic acid is reacted with an adduct formed from at least one amine and either urea or thiourea as new additives for lubricants and motor fuels; methods of preparing said new additives; and lubricant and motor fuel compositions containing said new additives.

An object of this invention is to provide an ashless additive for lubricants.

Another object of this invention is to provide improved additives exhibiting reduced deposit-forming tendencies in motor fuels.

Another object of this invention is to provide a method for the preparation of additives for lubricating oils and motor fuels.

Another object of this invention is to provide an improved lubricating composition utilizing the additives of the invention.

Another object of this invention is to provide improved motor fuel compositions utilizing the additives of the invention.

Other aspects, objects, and advantages of the invention will be apparent to those skilled in the art upon studying this disclosure.

Thus, according to the invention, there is provided new compositions of matter comprising the oil-soluble reaction product or products obtained upon reacting a petroleum sulfonic acid with an adduct formed from at least one amine and either urea or thiourea.

Further according to the invention, there is provided a process for producing an additive for lubricants and motor fuels which process comprises forming an adduct from at least one amine and either urea or thiourea, and then reacting the adduct thus formed with a petroleum sulfonic acid to form said additive.

Further according to the invention, there is provided as a new additive for lubricants and motor fuels a product additive obtained by the process described in the preceding paragraph.

Still further, according to the invention, there is provided new lubricating oil compositions comprising a major proportion of a lubricating oil base stock and a minor proportion of a new additive in accordance with the invention.

Still further, according to the invention, there is provided a new motor fuel composition comprising a major proportion of a motor fuel and a minor proportion of a new additive in accordance with the invention.

A wide variety of reaction conditions can be employed in the practice of the invention. Any reaction conditions under which the reactions involved in the invention will take place are within the scope of the invention. Similarly, any proportions of reactants which will react with each other to produce a product additive of the invention are within the scope of the invention. However, as will be understood by those skilled in the art in view of this disclosure, certain reaction conditions and reactant proportions are favored for economic reasons, i.e., the reactions proceed faster and give greater yields for some reaction conditions and some proportions of reactants. The reaction or reactions involved in preparing the product additives of the invention can be carried out in the presence or absence of a diluent which is chemically inert, i.e., does not react with the reactants or reaction products.

Generally speaking, in the practice of the invention the petroleum sulfonic acid and amine/urea or thiourea adduct are preferably reacted in amounts ranging from 1/1 to 3/1 equivalents of petroleum sulfonic acid/mole of amine used to prepare the adduct. A preferred range is 1.1/1 to 2.5/1. Generally speaking, sufficient petroleum sulfonic acid is used with the amine adduct to obtain a hydrocarbon-soluble reaction product. However, it is within the scope of the invention to employ operable ratios of sulfonic acid to adduct outside said ranges.

The reaction of said adduct and said petroleum sulfonic acid can be carried out at any temperature at which the reaction(s) involved will proceed. Generally speaking, said reaction is preferably carried out at temperatures within the range of from about 100° to about 200°F. However, it is presently preferred to employ temperatures in the range of 140° to 150°F although it is within the scope of the invention to employ operable temperatures outside said ranges.

A wide range of reaction times can be employed in the practice of the invention. Generally speaking, the reaction times employed for the reaction of said reactants will be within the range of from about 0.1 to about 20 hours. However, it is within the scope of the invention to employ operable times outside said ranges. The reaction can be conducted at any pressure, such as atmospheric pressure, suitable for carrying out the reactions involved.

It is currently preferred to contact the reactants in the presence of an inert diluent, the most preferred of which is a SAE 10 largely paraffinic lubricating oil base stock in amounts ranging from 0.2/1 to 10/1 parts by weight diluent per part by weight petroleum sulfonic acid. It is likewise currently preferred to add a solution of petroleum sulfonic acid in SAE 10 stock oil (approximately 60 weight percent petroleum sulfonic acid) slowly to a rapidly stirred dispersion of amine/urea or thiourea adduct in SAE 10 stock oil (approximately 30 weight percent adduct) while maintaining the temperature of the reaction system at 140° to 150°F.

If the currently preferred reaction conditions are employed, no further isolation or purification steps are necessary in order to use the product in gasoline or lubricating oil formulations. It is currently preferred to employ the crude reaction mixture for such purposes as described above without subsequent treatment. In some cases, however, it may be desirable to isolate and purify the product. Such may be accomplished by any methods currently known in the art, such as fractional crystallization, solvent extraction, etc.

Generally speaking, any petroleum sulfonic acid prepared in accordance with methods known in the art can be used as a starting reagent in the practice of the invention. Methods disclosed in U.S. Pat. No. 3,135,693, issued June 2, 1964, to W. B. Whitney et al, are exemplary of methods which can be used in preparing sulfonic acids which can be used in the practice of this invention.

A wide variety of oils can be used as the charge oil in preparing the petroleum sulfonic acids used in the practice of the invention. Preferably, said charge oil is selected from more viscous bright stock fractions of petroleum. A petroleum fraction having a viscosity of at least 90 SUS at 210°F will produce a petroleum sulfonic acid which is satisfactory in many instances. The deasphalted and solvent refined petroleum fractions having a viscosity of about 140 to about 270 SUS at 210°F are preferred. A presently more preferred sulfonation charge stock is a propane fractionated, solvent extracted, and dewaxed Mid-Continent oil of about 200 to about 230 SUS at 210°F. It is preferred that the sulfonation charge stock have a viscosity index of about 85 to 100, or even higher.

A Mid-Continent oil is more precisely defined as a mixed base or intermediate base oil in "The Science of Petroleum," Volume 1, page 7, Oxford University Press, London, New York and Toronto, 1938. The base of a crude petroleum is defined therein as follows: "The 'base' of a crude petroleum is descriptive of the chemical nature of its main constituents. A petroleum may be described as paraffin base, asphalt base, or mixed base (intermediate base), according as paraffin wax, asphalt, or both paraffin wax and asphalt are present in the residue after distillation of the lighter components. Typical representatives of these three classes are Pennsylvania, Mexican, and Mid-Continent petroleums, respectively."

The residual material discarded from the propane fractionation step contains the rejected asphalt and more aromatic oils. The lube oil fraction, recovered in a propane fractionation step after removal of the SAE 50 lube stock, is extracted with a selective solvent which will separate the paraffinic hydrocarbons from the more aromatic-type hydrocarbons for removal of these more aromatic-type hydrocarbons to prepare the preferred feedstock. The raffinate from the solvent extraction step is then dewaxed.

Sulfonating agents which are known to the art can be utilized in the sulfonation step in preparing said petroleum sulfonic acids. Sulfonating agents which can be so used include fuming sulfuric acid and liquid $SO_3$. Said fuming sulfuric acid can vary from 10 weight percent to 40 weight percent excess $SO_3$. However, when sulfuric acid is used it is usually preferred to use commercial fuming sulfuric acid which contains about 20 weight percent excess $SO_3$. Liquid $SO_3$, i.e., liquid $SO_3$ in liquid $SO_2$, is the presently preferred sulfonating agent for use in the practice of the invention. Such liquid $SO_3$ is commercially available.

When 20 percent fuming sulfuric acid is used as the sulfonating agent, the acid-oil ratio can be in the range of from about 0.1:1 to about 0.7:1, or even 1:1 to produce the petroleum sulfonic acids used in the practice of the invention. A preferred range of acid-oil ratios is in the range of about 0.3 to about 0.6:1. When liquid $SO_3$ in liquid $SO_2$ is the sulfonation agent, the $SO_3$ to oil weight ratios are maintained equivalent to those available from the 20 percent fuming sulfuric acid values given above. In other words, the $SO_3$ to oil ratio can be in the range of about 0.02 to 0.2, preferably about 0.06 to about 0.12:1. Said $SO_3$ to oil ratios can be controlled by varying the rate of flow of the oil or of the $SO_3$—containing medium, or both. The above given ratios are weight ratios.

Sulfonation temperatures can be controlled within the range of about 50 to about 200°F with the preferred operating range being between about 80° and about 150°F. At temperatures above about 200°F, excessive oxidation with liberation of sulfur dioxide may take place. A reaction time of about 20 to about 90 minutes is preferred when fuming sulfuric acid is utilized as the sulfonating agent in order to provide optimum yield and quality of products. When sulfur trioxide, e.g., sulfur trioxide in sulfur dioxide, is utilized as the sulfonation agent, the reaction rate is greatly accelerated and the reaction has been found to be substantially completed in the time required to accomplish suitable contact of the oil with the sulfur trioxide, usually less than about 5 minutes.

The sulfonation reaction can be carried out at atmospheric pressure although pressures greater or less than atmospheric also can be employed, if desired. When using liquid $SO_3$ in liquid $SO_2$ as the sulfonating agent, it is preferred to carry out the reaction at sufficient pressure to maintain the $SO_2$ in liquid phase.

As indicated hereinbefore, the above-described petroleum sulfonic acids are reacted with an adduct formed from at least one amine and either urea or thiourea to produce the product additives of the invention.

A wide variety of amines can be used in the practice of the invention. Presently preferred amines for use in the practice of the invention include (a) those containing from 2 to 12 carbon atoms per molecule and represented by the formula $RNH_2$ wherein R is alkyl, cycloalkyl, aryl, alkaryl, aralkyl, alkylcycloalkyl, cycloalkylalkyl, cycloalkylaryl, or arylcycloalkyl and (b) those polyamines represented by the formula $H_2N[(CH_2)_xNH]_yH$ wherein $X$ is a whole integer of from 2 to 6, inclusive, and $y$ is a whole integer of from 1 to 10, inclusive. Examples of suitable amines which can be used in the practice of the invention include, among others, the following: ethylamine, butylamine, 3-methylcyclopentylamine, decylamine, dodecylamine, cyclohexylamine, aniline, naphthylamine 3,5-diethylcyclohexylamine, m-toluidine, 2,3-xylidine, benzylamine, 3-cyclohexylbutylamine, p-cyclohexylaniline, 4-phenylcyclohexylamine, 3-methyl-4-phenylcyclopentylamine, ethylenediamine, and its homologs, diethylenetriamine, triethylenetetramine, tetraethylenepentamine, dipropylenetriamine, butylenediamine, hexamethylenediamine, tetrahexenepentamine, heptabutyleneoctamine, decapenteneundecamine, and the like.

The adduct of the above-described amine with either urea or thiourea is prepared by contacting the amine and either urea or thiourea in an amine:urea molar ratio of 1:1 to 2.5:1 with 1.5:1 to 2.25:1 currently being preferred. Said contacting is done under any conditions of time, temperature, and pressure which result in the desired product. Ordinarily, the reaction temperatures will be in the range of about 100° to about 350°F. Reaction times will be about 0.5 to about 20 hours. Any convenient pressure, such as atmospheric, can be used. It is currently preferred to heat the reaction mixture slowly to about 300°F to control ammonia evolution and reduce foaming, thereafter maintaining the temperature at about 300°F until ammonia evolution subsides or about four hours. If desired, an inert gas such as nitrogen can be bubbled through the reaction mixture.

It is sometimes desirable to pressurize the reactor with an inert gas to maintain the adduct forming reactants predominantly in the liquid phase, for example, from 0 to about 2,000 psig.

On occasion, it is desirable to employ an inert diluent in the production of the adduct of the amine and urea or thiourea. Such diluents include saturated aliphatic and cycloaliphatic hydrocarbons, aromatic hydrocarbons, etc. The presently preferred mode of operation is in the absence of diluent.

The adduct of the amine and either urea or thiourea can be isolated and purified by any convenient means, such as fractional distillation, crystallization, solvent extraction, etc. However, it is currently preferred to employ the crude reaction mixture for contacting with the petroleum sulfonic acid to produce the inventive composition.

The compositions of this invention, when used as a gasoline additive, are added directly to gasoline in either a purified state or as a crude reaction mixture as hereinbefore described. The quantity of additive utilized is in the range of 0.001 to 0.2, preferably 0.01 to 0.01, parts by weight additive per 100 parts by weight gasoline. When gasoline containing this additive is utilized in conventional internal combustion engines, the buildup of hard refractory deposits on intake valves is substantially diminished. In addition, the additive in gasoline is effective as an upper cylinder lubricant, a carburetor cleaner, a solvent for valve deposits, and a fuel line cleaner.

The gasolines into which the invention additives are dispersed are conventional motor fuel distillates boiling in the range of 70°–420°F. Gasolines or automotive fuels to which the described additives perform the functions described include substantially all grades of gasoline presently being employed in automotive and internal combustion aircraft engines. Generally, automotive and aircraft gasolines contain both straight-run and cracked stock with or without alkylated hydrocarbons, reformed hydrocarbons, and the like. Such gasolines can be prepared from saturated hydrocarbons, e.g., straight-run stocks, alkylation products, and the like, with or without gum inhibitors and with or without soluble lead compounds as, for example, tetraethyl lead (T.E.L.) or ethyl fluid. The gasolines may contain as much as about 5 ml of T.E.L. per gallon, such amounts being used commercially in aviation gasolines. These can be leaded or non-leaded and can contain other conventional fuel additives such as antioxidants and the like.

The compositions of this invention are oil-soluble and can be incorporated in lubricating oil formulations in combinations depending on specific service requirements. For example, in many general duty crankcase oil applications, the additives of the invention can be blended with appropriate base oils and other additives to provide high quality lubricating oils which meet the requirements and specifications for their intended use.

Generally speaking, the compositions of this invention can be added to the base lubricating oil in any amount sufficient to produce the desired degree of improvement. For example, the additives can be used in amounts ranging from 0.2 to 30 weight percent of the finished oil. A presently preferred concentration of petroleum sulfonic acid addition product is in the range of about 1 to 12 weight percent of finished oil.

The lubricating oils to which the invention compositions can be added include any suitable mineral oils of lubricating viscosity, such as those used for compounding lubricating oils of SAE 10 to SAE 50 viscosity. These oils can be derived from suitable naphthenic, paraffinic, and mixed base crudes. The lube oils can also contain other additives such as thickeners and the like.

EXAMPLE I

A petroleum sulfonic acid was prepared in Run 1 from a solvent-refined, dewaxed lubricating oil fraction derived from Mid-Continent petroleum and having the following properties: viscosity of about 4,200 SUS at 100°F and about 210 SUS at 210°F and viscosity index of about 97. This oil was sulfonated with a 10 percent $SO_3$—90 percent $SO_2$ mixture in a continuous operation substantially like that described by Whitney et al., U.S. Pat. No. 3,135,693. The $SO_3$/oil weight ratio was about 0.08 and the temperature of the reaction was controlled at about 115°F. The total reaction time, including mixing and soaking periods, was about five minutes. The system was maintained in liquid phase at a pressure of 100–120 psig. Effluent from the sulfonation unit was subjected to a two-stage flash for $SO_3$—$SO_2$ removal.

EXAMPLES II TO VII

The following runs illustrate the preparation of adducts of tetraethylenepentamine (TEPA) and urea or thiourea.

In Run 2 TEPA (108 gm) was placed in a 250 ml reactor and heated to 115°F. Urea (16 gm) was added slowly over a 10-minute period. The mixture was heated rapidly with stirring to 285°F and then slowly (1.5 hours) to 295°F. The system was maintained at 295° to 305°F for 3.5 hours with nitrogen bubbling through it. Elemental analyses of the crude reaction mixture are recorded in Table I.

Run 3 involved the same reactants and similar conditions as Run 2. Following mixture of the reactants the temperature was increased from 220°F to 300°F in two hours and was maintained at 300°F for 10 hours with nitrogen bubbling through it. Elemental analyses of the crude reaction mixture are given in Table I.

In Runs 4 and 5 TEPA (119.7 gm) was heated with stirring to 125°F in a 250 ml reactor. Thiourea (22.8 gm) was added slowly over a 5-minute period. After the mixture was heated rapidly to 240°F and then slowly (1.5 hours) to 300°F, the temperature was maintained at 300° to 315°F for four hours during which a stream of nitrogen was bubbled through the reaction mixture. Elemental analyses of the crude reaction mixtures are given in Table I.

Runs 6 and 7 were conducted using the same reactants and similar conditions to those described for Runs 4 and 5. The only differences employed in Run 6 were the use of 180 gm TEPA and 34.3 gm thiourea and maintenance of the temperature at 300°F for two hours with nitrogen bubbling through the system. Elemental analyses are included in Table I.

a 1-liter reactor. To the stirred mixture was added 715 ml of a solution containing 58.86 weight percent petroleum sulfonic acid in SAE 10 stock oil, said addition requiring 45 minutes with the temperature of the reaction mixture being maintained at 140°–150°F. The ratio of equivalents of petroleum sulfonic acid per mole original amine was 1.22. The product had a pH of 8.25 and was found to contain 1.31 weight percent nitrogen and 1.2 weight percent sulfur.

Run 9 was conducted as described for Run 8 with the following exceptions: 1,200 ml of 58.86 percent petroleum sulfonic acid solution, a 2-liter reactor, TEPA/urea adduct from Run 3 was used, addition time was 70 minutes, and after addition the temperature of the system was maintained at 145°F for 45 minutes. The ratio of equivalents of petroleum sulfonic acid per mole of original amine was 2.05. The product had a pH of 4.8 and was found to contain 0.8 weight percent nitrogen.

Run 10 was conducted as described for Run 8 with the following exceptions: 17 gm of TEPA/urea adduct from Run 3, 34 gm SAE 10 stock oil and 680 ml of 58.86 percent petroleum sulfonic acid solution were used; addition of acid to TEPA/urea adduct required 30 minutes. The ratio of petroleum sulfonic acid per mole of original amine was 2.05. Crude reaction mixture was combined with that from Run 9. The combined mixture was found to have a pH of 4.8 and to contain 0.8 weight percent nitrogen.

The crude reaction mixture from Run 8 was evaluated as a motor fuel additive by a laboratory gasoline deposit test and also by a carburetor detergency test.

The laboratory gasoline deposit test utilized was a modification of the method described in "A Bench Technique for Evaluating the Induction System Deposit Tendencies of Motor Gasolines," A. A. Johnston and E. Dimitroff (Society of Automotive Engineers, Fuels and Lubricants Meeting, Houston, Texas, November 1-3, 1966, Paper No. 660783).

The raw gasoline stock used in the gasoline deposit test was a commercial automotive premium gasoline sample containing tetraethyl lead and oxidation inhibitor but no other additives. The raw gasoline stock was passed through a 0.3 micron filter after which 0.04 parts by weight sulfurized terpene per 100 parts by

TABLE I

| Run No. | Reactant with TEPA | %C | %H | Elemental Analysis %N | %S | %O |
|---|---|---|---|---|---|---|
| 2 | Urea | 52.02 | 10.61 | 33.18 | | 4.19 |
| 3 | Urea | | | 31.61 | | 4.94 |
| Theory[a] | | 50.5 | 10.9 | 34.6 | | 4.0 |
| 4 | Thiourea | 49.13 | 9.23 | 32.29 | 6.8 | |
| 5 | Thiourea | 45.53 | 10.00 | 28.74 | 5.3 | 9.3 |
| 6 | Thiourea | 48.54 | 10.08 | 32.64 | 6.3 | |
| 7 | Thiourea | 48.82 | 11.03 | 33.51 | 6.3 | |
| Theory[b] | | 48.54 | 10.54 | 33.30 | 7.61 | |

[a]Calculated for $[H(NHC_2H_4)_4NH]_2CO$
[b]Calculated for $[H(NHC_2H_4)_4NH]_2CS$

EXAMPLES VIII to X

The following runs illustrate the reaction of the petroleum sulfonic acid of Run 1 with the TEPA/urea adducts of Runs 2 and 3. The usefulness of the products as motor fuel additives and lubricating oil additives is also demonstrated.

In Run 8 the TEPA/urea adducts of Run 2 (30 gm) and 60 gm of SAE 10 stock oil were heated to 145°F in weight filtrate was added. This procedure produced the gasoline source from which samples were taken for testing with and without the additives of this invention.

Briefly in accordance with the above-described modified procedure, the test gasoline (2 ml/min) was mixed with a flow of air (28 $ft_3$/hr) to form a gasoline-air mixture. The mixture was discharged from a nozzle as a spray against an aluminum deposit pan of known weight. The deposit pan which was preheated to 375°F was maintained at that temperature while the mixture was sprayed against it. After 250 ml of test gasoline was sprayed, the gasoline flow was terminated, but the airflow and temperature were maintained constant for another 15 minutes. The airflow was then terminated and the pan was allowed to cool to room temperature. Weighing of the pan then provided the weight of deposits in milligrams per 100 ml of test gasoline.

Evaluation results of the crude reaction mixture from Run 8 according to the above-described spray test are recorded in Table II.

TABLE II

| Fuel | Deposit, mg |
|---|---|
| Without additive | 1.5 |
| With additive[a] | 0.1 |

[a]Test gasoline contained 0.05 weight percent crude reaction mixture from Run 8.

The carburetor detergency test employed to evaluate the crude reaction mixture from Run 8 involved the use of test gasolines in a 170 cubic inch displacement 6 cylinder automobile engine with a removable carburetor throat insert. Operation of the engine was for 23 continuous hours at 1,800 rpm and 11.4 brake horsepower. Weighing the removable insert after these conditions of operation gave the weight of deposits formed. The weight of deposits was determined both before and after washing the insert with n-heptane.

Evaluation results of the crude reaction mixture from Run 8 according to the above-described carburetor detergency test are recorded in Table III.

TABLE III

| Fuel | Deposits, mg Unwashed | Washed |
|---|---|---|
| Without additive | 28.8, 30.3 | 19.4, 21.7 |
| With additive[a] | 26.1 | 15.9 |

[a]Base gasoline stock containing 10 pounds per thousand barrels (PTB) of the crude reaction product from Run 8.

The data in Tables II and III show the reduced deposit-forming tendencies of fuel containing this invention composition.

The evaluation of the invention composition obtained by combining the crude reaction mixtures of Runs 9 and 10 as a dispersant for lubricating oils was made using a laboratory carbon spot test and a standard automotive Ford Sequence V B test (described in ASTM Special Technical Publication No. 315-C).

The laboratory carbon spot dispersancy test is conducted by stirring 50 mg of carbon black into 10 gm of an oil blend containing 4 weight percent of the candidate additive. A drop of the resulting slurry is then dropped onto a polished Burns Block heated to a temperature of 500°F. The extent to which the carbon black is carried to the extremity of the resulting oil ring is a measure of the dispersancy characteristics of the additive.

The combined crude reaction mixtures from Runs 9 and 10 received a rating of "excellent +" according to the above-described carbon spot test.

The results of the Sequence V B test conducted using the combined crude reaction mixtures from Runs 9 and 10 and compared to the SAE requirements (1973 SAE Handbook Sec. J-183a, "SAE Recommended Practice for Engine Oil Performance," pp. 417-419) for a lubricating oil are tabulated in Table IV.

TABLE IV

| | Lube Oil[a] With Additive | SAE Requirements |
|---|---|---|
| Total Sludge (50=clean) | 39.7 | 42.5 |
| Total Varnish (50=clean) | 30.3 | 41.0 |
| Piston Varnish (10=clean) | 7.8 | 8.0 |
| Oil Screen Plugging, % | 2 | 5[b] |
| Oil Ring Plugging, % | 8 | 5[b] |

[a]A commercial SAE 10W-40 motor oil formulation containing calcium petroleum sulfonate, oxidation inhibitor, and viscosity index improver. This test formulation contained 10 weight percent of the combined crude reaction mixture from Runs 9 and 10 in place of the normally used commercial dispersant.
[b]Maximum values.

The data presented in Table IV show that the invention additive nearly equalled or surpassed the SAE requirement in three of the five test categories. Total varnish and oil ring plugging were below standard.

EXAMPLES XI TO XIII

The following runs illustrate the reaction of the petroleum sulfonic acid of Run 1 with the amine/thiourea adducts of Runs 4, 5, and 6. The usefulness of the products as motor fuel additives and lubricating oil additives is also demonstrated.

In Run 11 the TEPA/thiourea adduct of Run 4 (60 gm) and 60 gm SAE 10 stock oil were heated to 145°F in a three-liter reactor. To the stirred mixture was added slowly (2¼ hours) 1756 ml of a 58.86 weight percent solution of petroleum sulfonic acid from Run 1 in SAE 10 stock oil. The ratio of equivalents petroleum sulfonic acid per mole original amine was 1.56. Following completion of the addition, the mixture was stirred an additional one-half hour at 145°F. Analysis showed that this reaction mixture contained 1.29 (avg. of three determinations) weight percent N and 1.21 weight percent S.

Run 12 was run as described for Run 11 with the following exceptions: 70 gm TEPA/thiourea adduct from Run 5, 70 gm SAE 10 stock oil, and 2,045 ml of petroleum sulfonic acid solution were used; and addition required 1-⅓ hours. The ratio of equivalents of petroleum sulfonic acid per mole of original amine was 1.56. The product had a pH of 6.98 and was found to contain 0.94 (average of two determinations) weight percent N.

Run 13 was run in duplicate and the crude reaction mixtures were combined. Run 13 was conducted as described for Run 11 with the following exceptions: 90 gm of TEPA/thiourea adduct from Run 6, 90 gm SAE 10 stock oil, and 2,634 ml of petroleum sulfonic acid solution were used; and addition required two hours. The ratio of equivalents of petroleum sulfonic acid per mole of original amine was 1.56. The combined products exhibited a pH of 7.35 and were found to contain 1.16 (average of three determinations) weight percent N and 1.24 weight percent S.

When subjected to the laboratory carbon spot dispersancy test described in Examples VIII to X, the crude reaction mixtures of Runs 11 and 12 received an "excellent" rating; whereas that from Run 13 received an excellent + rating.

Sequence VB engine tests for evaluating the effectiveness of the invention compositions were conducted as described in Examples VIII to X. The test additives were the crude reaction mixtures from Runs 11, 12, and 13. Results are tabulated in Table V with the comparative SAE requirements.

TABLE V

|  | Lube Oil[a] With Additives | | | SAE |
|---|---|---|---|---|
|  | Run 11[b] | Run 12[c] | Run 13[d] | Reg. |
| Total Sludge (50=clean) | 44.3 | 39.3 | 37.6 | 42.5 |
| Total Varnish (50=clean) | 37.1 | 29.9 | 29.4 | 41.0 |
| Piston Varnish (10=clean) | 8.7 | 7.5 | 7.4 | 8.0 |
| Oil Ring Plugging, % | 0 | 2 | 32 | 5 |
| Oil Screen Plugging, % | 0 | 12 | 24 | 5 |

[a]A commercial SAE 10W-40 motor oil formulaton containing calcium petroleum sulfonate, oxidation inhibitor, and viscosity index improver.
[b]Formulaton contained 9 weight percent of Run 11 additive.
[c]Formulation contained 9 weight percent of Run 12 additive.
[d]Test was Sequence VC (only slight modification of Sequence VB test). Formulation contained 10 weight percent of Run 13 additive.

The data in Table V indicate that Run 11 additive produced results surpassing the SAE requirements in four of the five test categories and slightly inferior in total varnish. The reasons for poor results with Runs 12 and 13 additives are not well understood. Table I shows that the product of Run 5 contained 9.3 percent oxygen which is unexplained; no oxygen should have been present. Since the product of Run 5 was used in Run 12, it could have resulted in the anomalous results in Table V. Table I also reveals that the sulfur content of the product from Run 6 was lower than that from Run 4. This observation provides a possible partial explanation for the difference between the formulations using Runs 11 and 13 additives in Table V.

The crude reaction mixture from Run 11 was evaluated according to the laboratory gasoline deposit test described in Examples VIII to X. The results obtained using 0.05 weight percent of Run 11 additive compared to base gasoline stock containing no additive are given in Table VI.

TABLE VI

| Fuel | Deposits (mg) |
|---|---|
| Without additive | 1.5 |
| With additive | 0.1 |

The crude reaction mixture from Run 12 was evaluated according to the carburetor detergency test described in Examples VIII to X. The results obtained using 10 PTB Run 12 additive compared to a base gasoline stock containing no additive are given in Table VII.

TABLE VII

| Fuel | Deposits (mg) Washed |
|---|---|
| Without additive | 17 |
| With additive | 11.8 |

The data in Tables VI and VII illustrate the deposit-reducing characteristics imparted to test gasolines by the compositions of this invention.

I claim:

1. As a new composition of matter, oil-soluble reaction product obtained upon reacting for a time and under conditions of temperature and pressure to produce said reaction product;
   a. A petroleum sulfonic acid with
   b. an adduct formed from
      1. at least one amine selected from primary monoamines having from 2 to 10, inclusive, carbon atoms, and polyamines represented by the formula $H_2N[(CH_2)_xNH]_yH$ wherein $x$ is an integer of from 2 to 6 and $y$ is an integer of from 1 to 10, and
      2. urea or thiourea.

2. A composition according to claim 1 wherein (a) is a petroleum sulfonic acid prepared by sulfonating a petroleum hydrocarbon fraction having a viscosity within the range of 90 to 270 SUS at 210°F and a viscosity index of at least about 85 and (b) is an adduct of tetraethylenepentamine and urea.

3. A composition according to claim 1 wherein (a) is a petroleum sulfonic acid prepared by sulfonating a petroleum hydrocarbon fraction having a viscosity within the range of 90 to 270 SUS at 210°F and a viscosity index of at least about 85 and (b) is an adduct of tetraethylenepentamine and thiourea.

4. A composition according to claim 1 wherein said adduct (b) is prepared by contacting the amine and either urea or thiourea in an amine/urea molar ratio of 1/1 to 2.5/1 and further wherein the amount of (a) reacted with (b) ranges from 1/1 to 3/1 equivalents of petroleum sulfonic acid/mole of amine used to prepare the adduct.

5. A composition according to claim 1 wherein said reactants (a) and (b) are reacted in the presence of a chemically inert diluent at a temperature in the range of about 100° to about 300°F for a period of time within the range of about 0.5 to about 20 hours.

6. A process for producing additives for lubricants and motor fuels which comprises the steps of
   introducing an amine selected from primary monoamines having from 2 to 10, inclusive, carbon atoms, and polyamines represented by the formula $H_2N[(CH_2)_xNH]_yH$ wherein x is an integer of from 2 to 6 and y is an integer of from 1 to 10, and either urea or thiourea into a reaction zone and maintaining temperature and pressure for a time sufficient for forming an adduct from said amine and either urea or thiourea,
   introducing a petroleum sulfonic acid into said reaction zone containing said adduct,
   interacting said petroleum sulfonic acid and said adduct in said reaction zone "at a temperature and pressure for a time sufficient to produce said additives", and
   recovering said additive from the resulting reaction mixture.

7. A process according to claim 6 wherein the ratio of amine to either urea or thiourea introduced into said reaction zone is in a molar ratio of 1/1 to 2.5/1 of amine to urea or thiourea and the reaction zone is maintained at a temperature of about 100° to about 350°F during the formation of said adduct.

8. A process according to claim 6 wherein the amount of petroleum sulfonic acid introduced into said reaction zone ranges from 1/1 to 3/1 equivalents of petroleum sulfonic acid/mole of amine used to prepare the adduct and the reaction zone is maintained at a temperature of about 100° to about 200°F during said interreacting.

9. A process according to claim 6 wherein said reactants are reacted in the presence of a chemically inert diluent at a temperature in the range of about 100° to about 300°F for a period of time within the range of about 0.5 to about 20 hours.

10. A process according to claim 6 wherein said adduct is formed from tetraethylenepentamine and either urea or thiourea and said petroleum sulfonic acid is prepared by sulfonating a petroleum hydrocarbon fraction having a viscosity within the range of 90 to 270 SUS at 210°F with a viscosity index of at least about 85.

* * * * *